(12) United States Patent
Honsberg

(10) Patent No.: US 6,366,058 B1
(45) Date of Patent: Apr. 2, 2002

(54) CAPACITOR POWER SUPPLY UNIT

(75) Inventor: Marco Honsberg, Dusseldorf (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 09/530,633

(22) PCT Filed: Nov. 10, 1998

(86) PCT No.: PCT/EP98/07183

§ 371 Date: May 3, 2000

§ 102(e) Date: May 3, 2000

(87) PCT Pub. No.: WO99/30408

PCT Pub. Date: Jun. 17, 1999

(30) Foreign Application Priority Data

Dec. 6, 1997 (DE) .......................................... 197 54 239

(51) Int. Cl.[7] ............................ H02J 7/00; H02M 3/315
(52) U.S. Cl. ............................ 320/166; 363/27; 323/222
(58) Field of Search ............................ 323/222, 282; 363/27, 41; 320/166

(56) References Cited

U.S. PATENT DOCUMENTS

| | | | |
|---|---|---|---|
| 4,346,431 A | * | 8/1982 | Steigerwald ................ 323/222 |
| 5,612,610 A | * | 3/1997 | Borghi et al. ............... 323/222 |
| 5,745,352 A | * | 4/1998 | Sandri et al. ................. 363/41 |
| 5,892,353 A | * | 4/1999 | Yama ......................... 323/282 |
| 5,923,154 A | * | 7/1999 | Moller ....................... 323/222 |

* cited by examiner

Primary Examiner—Peter S. Wong
Assistant Examiner—Pia Tibbits
(74) Attorney, Agent, or Firm—Brooks & Kushman P.C.

(57) ABSTRACT

A capacitor power supply unit for generating an auxiliary direct voltage supply from a main alternating voltage supply for powering an electrical consumer includes a storage capacitor and a charging capacitor. The storage capacitor provides an auxiliary direct voltage supply for powering an electrical consumer and the charging capacitor is operable for charging the storage capacitor with current generated by a main alternating voltage supply. Rectifying means rectify the current charging the storage capacitor. Switching means switch between first and second switch positions for enabling the charging capacitor to charge the storage capacitor and for disabling the charging capacitor from charging the storage capacitor. A switching time-determining member provides a switching time control signal to the switching means as a function of voltage output by the charging capacitor. The switching time control signal is enabled when the voltage output by the charging capacitor is less than a reference voltage such that current through the switching means is substantially non-existent. A charging state-determining member provides a charging state control signal to the switching means as a function of charging state of the storage capacitor. The charging state control signal is enabled when the charging state of the storage capacitor is less than a limit value and is disabled when the charging state of the storage capacitor is greater than the limit value. The switching means switches to the first switch position when both signals are enabled for enabling the charging capacitor to charge the storage capacitor. The switching means switches to the second switch position when the switching time control signal is disabled and the charging state control signal is enabled for disabling the charging capacitor from charging the storage capacitor.

9 Claims, 3 Drawing Sheets

CAPACITOR POWER SUPPLY UNIT

TECHNICAL FIELD

The invention relates to the field of mains power supply units for supplying electronic assemblies, in particular the invention relates to a capacitor power supply unit comprising a charging capacitor for charging up a further capacitor (storage capacitor) for the purpose of operating an electric power consumer, a rectifier which is disposed between the charging capacitor and the storage capacitor, and a switching means which by applying circuit engineering technology is disposed between the charging capacitor and the storage capacitor and has a control input which has applied to it the outputs of a member which determines the point in time, at which switching is to occur, which member is influenced by a small reference voltage in comparison with the mains alternating voltage, for the purpose of determining the point in time for switching over the switching means from a switch position which charges the storage capacitor, to a switch position which interrupts the charging procedure, in dependence upon the voltage applied on the output side to the charging capacitor, and a charging state-determining member for the purpose of determining the charging state of the storage capacitor. The invention also relates to a method of operating a capacitor power supply unit.

BACKGROUND ART

Capacitor power supply units are widely used for the purpose of generating auxiliary voltage supplies which are not separated from the mains supply. These types of auxiliary voltages usually serve to supply electronic assemblies, for example, to supply the electronics used for controlling the rotational speed in boring machines. The principle of a capacitor power supply unit is based upon the cyclic recharging of the charging capacitor which is used as a charging pump for the storage capacitor and charges same during each mains supply cycle. A breakdown diode is used for the purpose of stabilizing this type of capacitor power supply unit. In the context of these statements, the term breakdown diode relates to all diodes which are reverse biassed and are also known as a Zener diode or avalanche diode.

By reason of their straightforward and cost-effective design, capacitor power supply units are widely used for small output powers with a virtually constant load. However, a problem arises in the use of this type of capacitor power supply unit, if the load is relatively large and is subjected to severe fluctuations in dependence upon the operating point. This change in load can lead to an extreme loading of the breakdown diode, which ultimately can cause the breakdown diode, the storage capacitor and thus the entire power supply unit to be destroyed. This effect is particularly damaging if this type of capacitor power supply unit is encapsulated, for example, in a housing, so that the heat produced in the breakdown diode cannot be dissipated or is only dissipated inadequately, so that the thermal loading can cause the breakdown diode to become unsoldered. The capacitor power supply unit is then no longer functional.

In order to lessen these disadvantages, capacitor power supply units have been developed, as described, for example, in DE 38 01 399 A1, wherein the switching procedure for switching over the switching means from a switch position which charges the storage capacitor, to a switch position which interrupts the charging procedure, is performed at a point in time, at which the switching means is supplied with only a small amount of current. As a consequence, no steep switching transients should be produced in the case of this switching procedure. This is achieved by virtue of the fact that the switching means has a control device connected upstream, which serves to move the switching means to its switch position which interrupts the charging procedure if the voltage applied on the output-side to the charging capacitor is small corresponding the cycle of the mains voltage. At such a point in time when switching occurs, the switching means is only supplied with a small amount of current. This capacitor power supply unit is then switched to the charging operation, if the output voltage of the storage capacitor is less than a predetermined desired value. This switching procedure is exclusively dependent* upon the charging state of the storage capacitor and can therefore be performed at any time with regard to the cycle of the mains voltage. Even if, in the most favourable case, the switch can only be subjected to low voltage at this point in time when switching occurs, the switching means is still supplied with a relatively high level of current, so that the occurrence of current peaks cannot be excluded.

When the electric power consumer is operated in a continuous manner, the required current is drawn off continuously from the storage capacitor. By virtue of the procedure of controlling the switching means, as described in this document, the switching means is continuously switched in a reciprocating manner between the two operating positions corresponding to the frequency of the mains supply cycle or the rectified voltage half-waves. The loss of power which occurs in particular when switching the switching means to the charging operation of the storage capacitor means that there is the risk that the electronic components can be heated up to the point of being destroyed.

SUMMARY OF THE INVENTION

On the basis of the discussed prior art, the object of the invention is therefore to provide a capacitor power supply unit which is also suitable for permanently operating the electric power consumer connected thereto.

Furthermore, the object of the invention is to provide a corresponding method of operating a capacitor power supply unit.

In accordance with the invention, the object relating to the device is achieved by virtue of the fact that the switching time-determining member and the charging state-determining member, when connected together by wires so as to represent a logical AND-function, influence the control input of the switching means, so that both switching procedures of the switching means—switching the capacitor power supply unit to the charging operation and switching same for the purpose of interrupting the charging operation—are performed at a point in time, at which the voltage applied on the output-side to the charging capacitor is less than or equal to the reference voltage.

In accordance with the invention, the object relating to the method is achieved by virtue of the fact that on the basis of a charging operation for charging a storage capacitor, the method of operating a capacitor power supply unit with a switching means comprises the steps of:

- comparing the phase-sensitive voltage, which is applied on the output-side to a charging capacitor, to a reference voltage,
- providing a control signal with a switching time-determining member for the purpose of controlling the switching means, if the applied voltage is less than or equal to the reference voltage,
- determining the charging state of the storage capacitor by means of a charging state-determining member, providing a control signal for the purpose of controlling the switching means, if the charging state of the storage capacitor is greater than a predetermined limit value, which steps relating to the charging state can be performed simultaneously with the steps relating to the switching time, switching the switching means for the purpose of interrupting the charging procedure of the storage capacitor, if both the charging state of the storage capacitor exceeds a predetermined limit value and also if the voltage, which is applied on the output-side to the charging capacitor, is less than or equal to the reference voltage, switching the switching means back to the charging operation, if both the charging state of the storage capacitor is less than or equal to a predetermined limit value and also if the voltage, which is applied on the output-side to the charging capacitor, is less than or equal to the reference voltage.

In the case of the capacitor power supply unit in accordance with the invention, the switching time-determining member and the charging state-determining member are electronically connected together by virtue of a logical AND-function and in this manner influence the control input of the switching means. A switching procedure is therefore only triggered, if corresponding control signals from the switching time-determining member and the charging state-determining member are simultaneously applied to the control input of the switching means. The charging state-determining member can supply two control signals, of which one indicates the state of the storage capacitor, wherein the output voltage thereof is greater than a predetermined desired value indicating the limit value of the output voltage, and of which another signal indicates the state of the storage capacitor, wherein its output voltage is less than or equal to the desired value. If the first-mentioned control signal is applied, it is not necessary to recharge the storage capacitor subsequently. If, in contrast, the last-mentioned control signal is applied, then the said storage capacitor is no longer filly charged and can be recharged subsequently. However, the switching means is actually only operated, resulting in the capacitor power supply unit being switched to its charging operation for the purpose of charging the storage capacitor, if the switching time-determining member provides a control signal which guarantees that the switching means is currentless or quasi currentless. For this purpose, the switching time-determining member is influenced by a reference voltage which is extremely low with respect to the mains alternating voltage and expediently is approximately 0 V or equal to 0 V. The control signal of the switching time-determining member is then provided if the voltage applied on the output-side to the charging capacitor is less than or equal to the reference voltage. This ensures that the switching means is only switched if the switching means is currentless or substantially currentless. Furthermore, the logical AND-operation of the two control signals, which influence the control input of the switching means ensures that during permanent operation of the electric power consumer connected to the capacitor power supply unit, the switching means is not switched but remains in its open position, which represents the charging operation of the capacitor power supply unit, until the operation of the electric power consumers has been stopped and correspondingly the output voltage at the storage capacitor has exceeded the desired value as a result of the subsequent charging procedure.

By selecting the switching times and by virtue of the switching procedures which are small in comparison with previously known capacitor power supply units, with regard to electromagnetic compatibility, the capacitor and the mains supply are only subjected to an extremely small pulse loading which can be well below the prescribed limit value.

The capacitor power supply unit in accordance with the invention thus accomplishes the principle of subsequently recharging the storage capacitor in a controlled manner using a soft switching procedure for the purpose of interrupting and switching on the charging procedure. Therefore, even in the case of relatively large, operating point-dependent loads which fluctuate to a considerable extent, the capacitor power supply unit is only heated to an insignificant extent. This type of capacitor power supply unit can thus also be used for the purpose of controlling a relay without having to provide any additional cooling features.

In an expedient manner, the switching time-determining member is provided in the form of a comparator member which serves to compare the applied voltage as a function of the phase of the voltage curve with a predetermined reference voltage. The reference voltage is selected in such a manner that it represents a voltage in the range of the zero crossing of the voltage curve which is applied on the output-side to the charging capacitor. A particularly favourable reference voltage is 0 V, so that it is only possible to actuate the switching means if the switching means is currentless.

It is particularly expedient to provide the elements which are required for the capacitor power supply unit as electronic circuits or switching elements. In an advantageous manner, when providing this type of capacitor power supply unit an electronic semiconductor switch, in particular a thyristor, can be used whose gate has applied to it the outputs of the switching time-determining member and the charging state-determining member. Depending upon the design of the capacitor power supply unit, it can be expedient that connected upstream of the control input of the switching means is a storage member for the purpose of storing the control signals produced by the switching time-determining member and the charging state-determining member. It should be noted in this connection that the use of a thyristor is a possible example and that it is also possible to use different electronic switching means which function in the same manner, such as triacs.

In one capacitor power supply unit having electronic components, the switching time-determining member, which is produced by a circuit, and the charging state-determining member, which is likewise produced by a circuit, are connected together by wires in the form of an AND-function (a so-called wired AND-function). The reference voltage can be provided externally so as to influence the switching time-determining member or—as in a preferred embodiment—said reference voltage can be provided by virtue of a Zener diode which is allocated to the switching time-determining member.

BRIEF DESCRIPTION OF THE DRAWINGS

Further advantages and developments of the invention are included in further subordinate claims and the description hereinunder of a preferred exemplified embodiment. In the drawing.

BEST MODES FOR CARRYING OUT THE INVENTION

Figure 1:
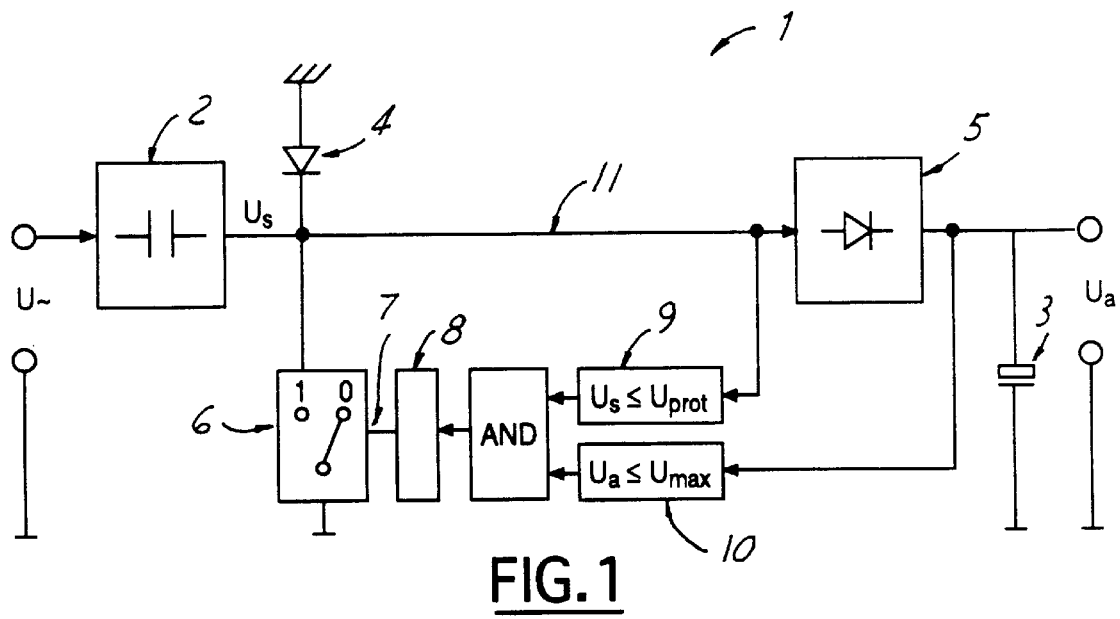
FIG. 1 shows a schematic block diagram of a capacitor power supply unit having a switching means in the charging operation.

FIG. 1 shows in a schematic block diagram a capacitor power supply unit 1. The capacitor power supply unit 1 comprises a charging capacitor 2 which is arranged for the purpose of charging a storage capacitor 3. The capacitance of the storage capacitor 3 is a number of times greater than the capacitance of the charging capacitor 2. The ratio of the two capacitances with respect to each other is such that the ripple of the output voltage $U_a$ of the storage capacitor 3 is limited to the required value specified by the load. In order to rectify the mains-side alternating voltage $U_\sim$, two diodes 4, 5 are provided. As a consequence, this voltage rectifier 4, 5 serves in each case to provide voltage half-waves, which are separated with respect to time by one half-wave.

By applying circuit engineering technology, a switching means 6 is disposed between the charging capacitor 2 and the storage capacitor 3 and is located in its position illustrated in FIG. 1 in the position "0" for the purpose of charging the storage capacitor 3. The switching means 6 comprises a control input 7 which is connected to the output of a storage member 8. The storage member 8 is influenced by the control signals both of a switching time-determining member 9 and also of a charging state-determining member 10. The switching time-determining member 9 is connected on the input-side to a charging line 11 which connects the charging capacitor 2 and the storage capacitor 3 via the diode 5, wherein the tap is provided on the charging capacitor-side upstream of the diode 5. The input of the charging state-determining member 10 is arranged to tap the output voltage of the storage capacitor 3.

Figure 2:
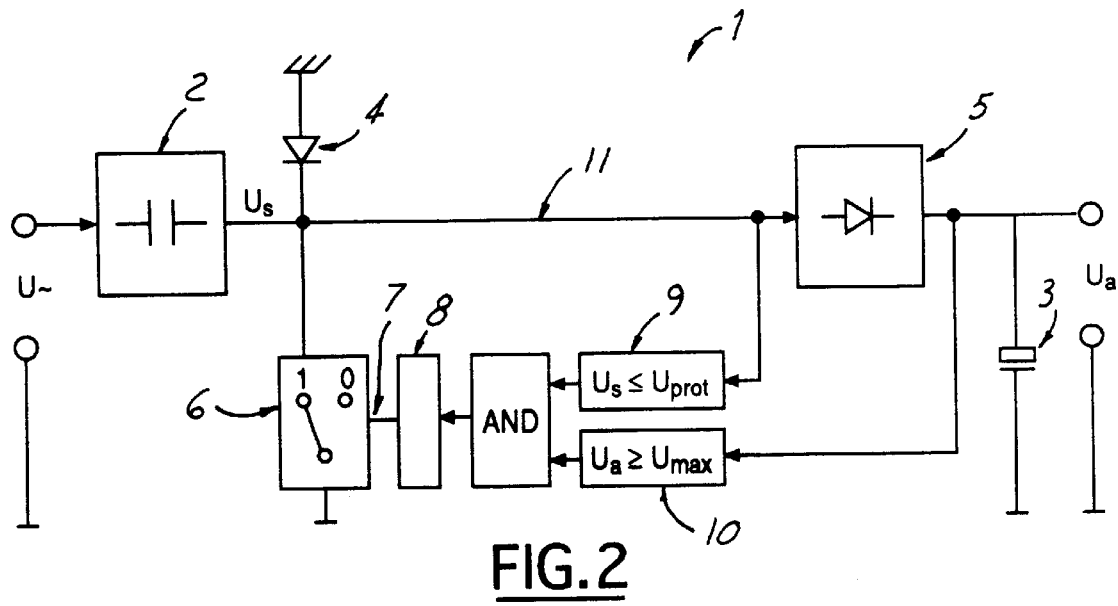
FIG. 2 shows the capacitor power supply unit of FIG. 1 in its position which interrupts the charging operation.

The switching time-determining member 9 compares the voltage $U_s$ in the charging line 11 with a reference voltage $U_{prot}$ which is either applied to a further input of the switching time-determining member 9 or is provided on the electronic path. The switching time-determining member 9 then generates a control signal which is transmitted to the switching means 6, if the voltage $U_s$ of the charging line 11 is less than or equal to the reference voltage $U_{prot}$. In the exemplified embodiment illustrated, the reference voltage $U_{prot}$ is 7 V. In order actually to switch the switching means 6 from the position "0" to the position "1" which interrupts the charging procedure (as illustrated in FIG. 2), it is also necessary to provide or generate a control signal of the charging state-determining member 10. This then generates a control signal, if the tapped output voltage $U_a$ of the storage capacitor 3 exceeds a predetermined limit value $U_{max}$. The storage member 8 transmits a control signal to the switching means 6 for the purpose of switching same from the position "0" to the position "1", if the said two AND-operation conditions are fulfilled.

If both conditions are fulfilled, then the switching means 6 switches to the position "1", whereby the charging procedure of the storage capacitor is interrupted by dissipating the current flow towards earth. By performing the switching procedure at a point in time, at which the phase of the voltage curve applied on the output-side to the charging capacitor 2 is located in a range of its zero crossing—at a voltage $\leq \pm 7$ V in the illustrated exemplified embodiment—there is no risk of over-current peaks being produced which could cause the switching means 6 to be destroyed; the mains supply and the capacitor power supply unit are also only subjected to an extremely small pulse loading.

The capacitor power supply unit 1 then switches to the charging operation which subsequently recharges the storage capacitor 3, if both the output voltage $U_a$ of the storage capacitor 3 falls below the limit value $U_{max}$ and also if the switching time-determining member provides a control signal, according to which the voltage $U_a$ applied on the output-side to the charging capacitor is less than or equal to the reference voltage $U_{prot}$.

Figure 3:
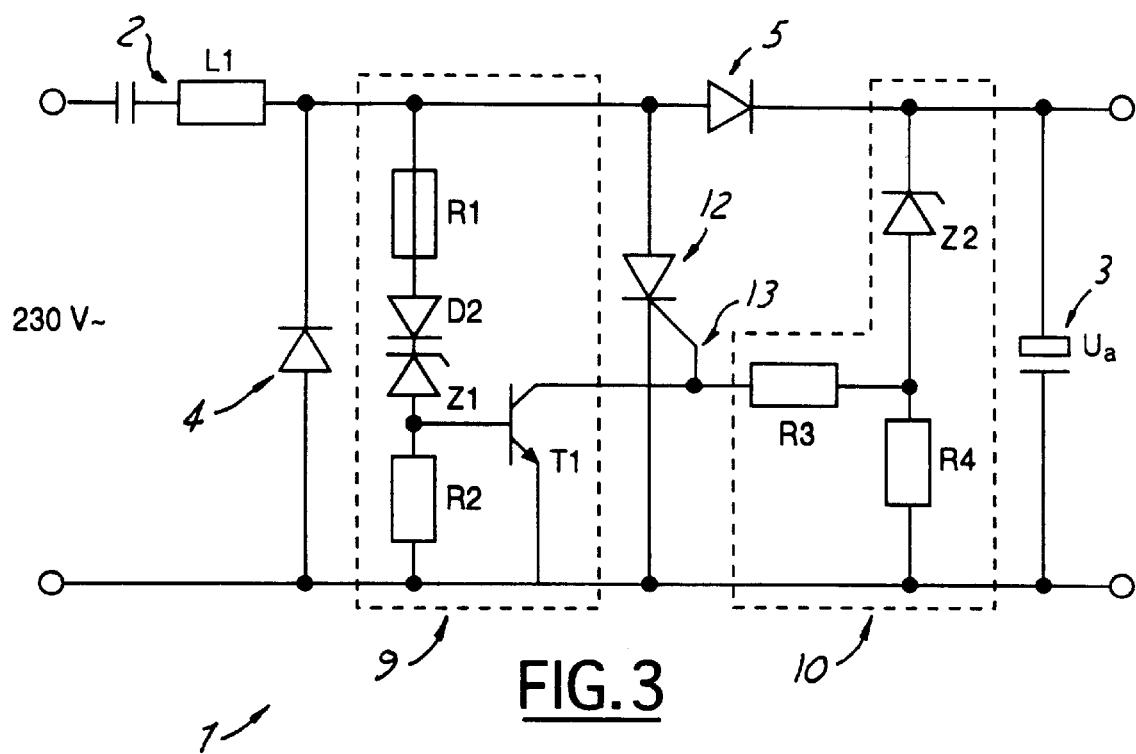
FIG. 3 shows a circuit diagram of a capacitor power supply unit in accordance with the block diagrams illustrated in FIGS. 1 and 2.
Figure 4A:
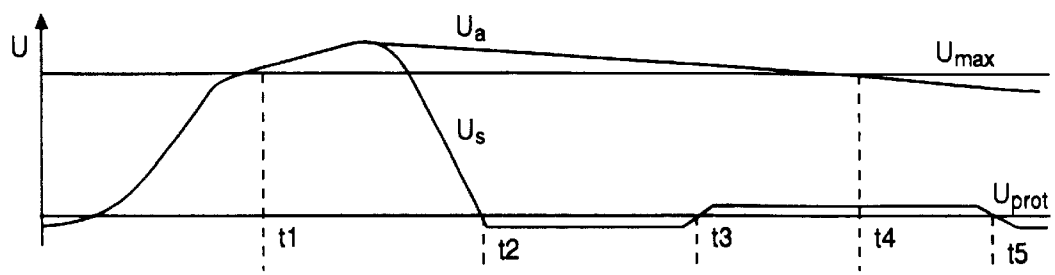
FIG. 4 shows several state and condition diagrams arranged one on top of the other for the purpose of illustrating the condition-dependent switching procedure for a switching means which is used in a capacitor power supply unit as shown in FIGS. 1 to 3.
Figure 4B:
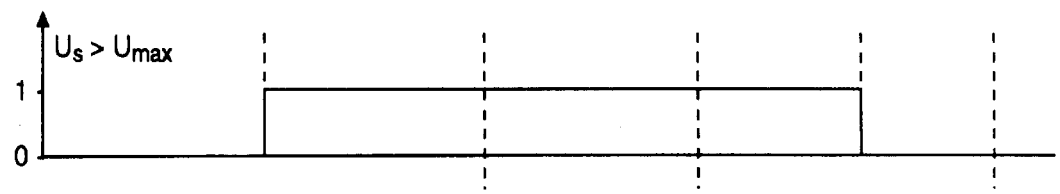
Figure 4C:
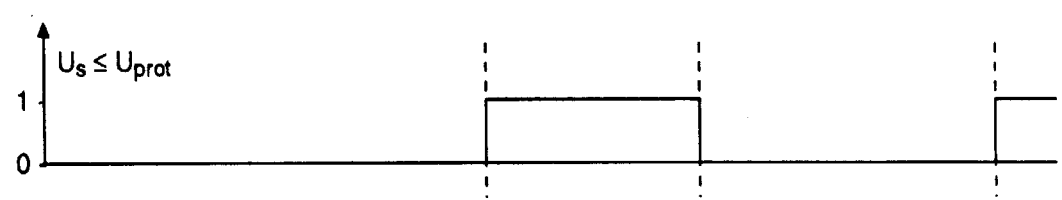
Figure 4D:
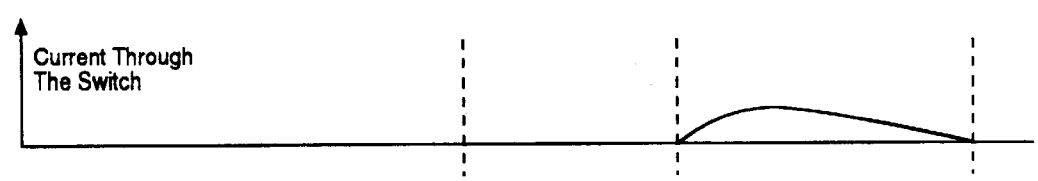
Figure 4E:
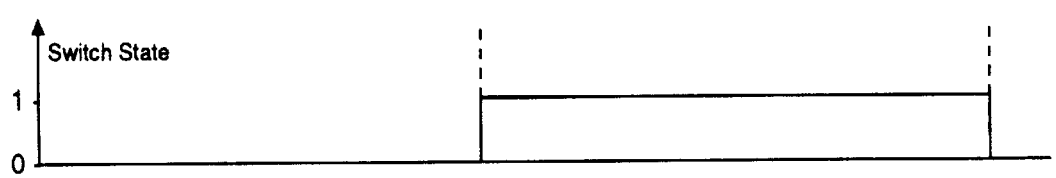
Figure 4F:
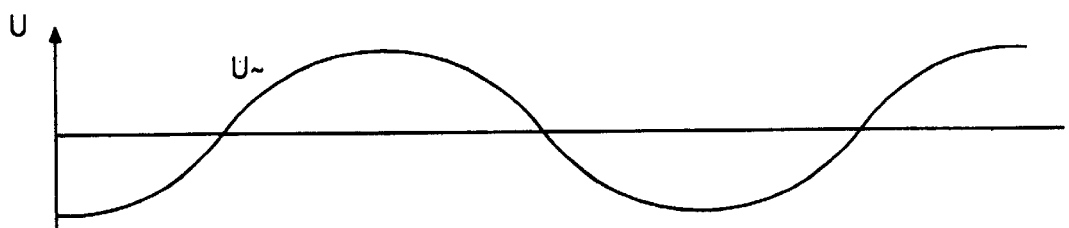

FIG. 3 shows in one embodiment the circuit diagram of the capacitor power supply unit 1. The switching means used is a thyristor 12, whose gate 13 is connected to the outputs of the switching time-determining member 9 and of the charging state-determining member 10. The switching time-determining member 9 is produced by two resistors R1, R2, a diode D2, a Zener diode Z1 and a transistor T1 as an inverter. The reference voltage of 7 V is provided in the case of the illustrated switching time-determining member 9 by virtue of the Zener diode Z1. The charging state-determining member 10 is produced by two resistors R3, R4 and a Zener diode Z2. The two rectifying diodes are designated by the reference numerals 4 and 5.

In addition, in the illustrated embodiment an impedance L1 is disposed on the output-side on the charging capacitor 2 for the purpose of limiting the current increase in the first switch-on moment of the device and also the critical current increase of the thyristor 12 in the stationary case. The circuit diagram in FIG. 3 illustrates that with respect to circuit engineering technology the switching time-determining member 9 and the charging state-determining member 10 represent an AND-operation—a so-called wired AND-function.

The diagrams of FIG. 4 plot the time in the direction of the x-axes and voltages or states on the y-axes. The uppermost diagram plots the curve of the voltage $U_a$ applied on the output-side to the storage capacitor 3, and the curve of the voltage $U_s$ applied on the output-side to the charging capacitor 2 and the reference voltage $U_{prot}$ and the limit value of the output voltage $U_{max}$ (desired value) of the storage capacitor 3. The time interval, in which the condition that the output voltage $U_a$ of the storage capacitor 3 is greater than the limit voltage $U_{max}$, is evident in the lower diagram. The third diagram illustrates the times, in which the further condition is fulfilled, namely that the voltage $U_s$, which is applied on the output-side to the charging capacitor 2, is less than or equal to ($\leq$) $U_{prot}$.

The two subsequent diagrams illustrate on the one hand the time period, in which the switching means is supplied with current, and the switch state. The diagram at the bottom plots the voltage curve $U_\sim$ applied on the mains-side.

On the basis of a state of the storage capacitor 3, in which its output voltage $U_a < U_{max}$, the capacitor power supply unit 1 is performing the charging operation for charging the storage capacitor 3. At time $t_1$, the voltage $U_a$ applied on the output-side to the storage capacitor 3 exceeds the limit value of the output voltage $U_{max}$ thus fulfilling the one switching condition $U_a > U_{max}$ for the purpose of switching over the capacitor power supply unit 1 or its switching means 6, 12. However, the switching means 6, 12 are only switched over at a point in time, in which the further condition $U_s \leq U_{prot}$ is fulfilled. This point in time is denoted as $t_2$. As a consequence of fulfilling the two conditions required for interrupting the charging operation, the switching means 6, 12 is closed; from this point in time, the switch state is in the position "1" (see FIG. 2).

The maximum value of the voltage $U_a$ and $U_s$ respectively corresponds to the maximum value with respect to time of the voltage curve U__applied on the mains-side. The voltage $U_s$ applied on the output-side to the charging capacitor 2 decreases with the cycle of the mains voltage U__, until this voltage $U_s$ falls below the value of the reference voltage $U_{prot}$ during time $t_2$. During the cycle of the voltage curve U__applied on the mains-side, the voltage $U_s$ exceeds the reference voltage $U_{prot}$ at time $t_3$ which represents the negative maximum value of the voltage curve U__in this cycle. Beginning with time $t_3$ the switching means 6, 12 is supplied with current. It is no longer possible to actuate the switching means 6, 12, since the condition $U_s < U_{prot}$ is not fulfilled in this period of time.

As the output voltage $U_a$ of the storage capacitor 3 decreases, it falls below the limit value $U_{max}$ at time $t_4$. Beginning with time $t_4$, the condition for switching the switching means 6, 12 to the charging operation is consequently fulfilled once again. However, it is not possible to switch the switching means 6, 12 at time $t_4$, since at this point in time the further condition $U_s \leq U_{prot}$ is not fulfilled. Only at the time of the next positive maximum value of the mains voltage curve U__time $t_5$ —does the voltage $U_s$ applied on the output-side to the charging capacitor 2 fall once again below $U_{prot}$. Therefore, the further condition $U_s \leq U_{prot}$ is also only fulfilled at time $t_5$, so that the switching means 6, 12 now switches once again to its charging position "0".

In a further exemplified embodiment [not illustrated in the Figures] which is formed corresponding substantially to the exemplified embodiment illustrated in FIG. 3, a capacitor is connected in parallel with the resistor R2. This produces a time-delay in the time $t_2$ illustrated in FIG. 4, so that it is only then possible to perform a switching procedure, if $U_s$ is less than $U_{prot}$.

When using this type of capacitor it can also be possible to use as a quasi indirect reference voltage the low through-switching voltage— e.g. 0.7 V—of the transistor T1 shown in FIG. 3, wherein $U_{prot}$ then assumes the value of 0 V. In such a case, it is not necessary to use the diodes Z1, D2. The delay in the switch-on capability, which is produced by using the said capacitor, guarantees that a switching procedure is only performed, if the phase of $U_s$ is less than $U_{prot}$ wherein $U_{prot}$ corresponds to an assumed voltage of 0 V. $U_s$ is negative in this case. Therefore, no current is supplied in the switching means at the switching time, so that it is not possible for current peaks to be generated during a switching procedure.

List of Reference Numerals

1 capacitor power supply unit
2 charging capacitor
3 storage capacitor
4 diode
5 diode
6 switching means
7 control input
8 storage member
9 switching time-determining member
10 charging state-determining member
11 charging line
12 thyristor
13 gate
R1 resistor
R2 resistor
D2 diode
Z1 zener diode
T1 transistor
R3 resistor
R4 resistor
Z2 zener diode
L1 impedance
$U_s$ input voltage
$U_a$ output voltage
$U_{prot}$ reference voltage
$U_{max}$ limit value of the output voltage

What is claimed is:

1. A capacitor power supply unit for generating an auxiliary direct voltage supply from a main alternating voltage supply for powering an electrical consumer, the capacitor power supply unit comprising:
   a storage capacitor for providing an auxiliary direct voltage supply for powering an electrical consumer;
   a charging capacitor operable for charging the storage capacitor with current generated by a main alternating voltage supply;
   rectifying means disposed between the charging capacitor and the storage capacitor for rectifying the current charging the storage capacitor;
   switching means disposed between the charging capacitor and the storage capacitor, wherein the switching means is switchable between a first switch position for enabling the charging capacitor to charge the storage capacitor and a second switch position for disabling the charging capacitor from charging the storage capacitor;
   a switching time-determining member for providing a switching time control signal to the switching means, wherein the switching time control signal is a function of voltage output by the charging capacitor, wherein the switching time control signal is enabled when the voltage output by the charging capacitor is less than a reference voltage such that current through the switching means is substantially non-existent; and
   a charging state-determining member for providing a charging state control signal to the switching means, wherein the charging state control signal is a function of charging state of the storage capacitor, wherein the charging state control signal is enabled when the charging state of the storage capacitor is less than a limit value and is disabled
   wherein the switching means switches to the first switch position when the switching time control signal and the charging state control signal are enabled for enabling the charging capacitor to charge the storage capacitor.

2. The capacitor power supply unit of claim 1 wherein:
   the switching means switches to the second switch position when the switching time control signal is disabled and the charging state control signal is enabled for disabling the charging capacitor from charging the storage capacitor.

3. The capacitor power supply unit of claim 1 wherein:
   the charging state-determining member determines the charging state of the storage capacitor by detecting the voltage output by the storage capacitor.

4. The capacitor power supply unit of claim 1 wherein:
   the switching means includes an electronic semiconductor switch.

5. The capacitor power supply unit of claim 4 wherein:
   the semiconductor switch is a thyristor having a gate for receiving the control signals of the switching time-determining member and the charging state-determining member.

6. The capacitor power supply unit of claim 1 wherein:

the reference voltage is approximately 0 Volts such that the electrical current through the switching means is 0 amperes.

7. The capacitor power supply unit of claim 6 wherein:

the reference voltage is 0 Volts and the switching voltage for actuating the switching means is the through-switching voltage of a transistor disposed in the switching time-determining member.

8. A method of operating a capacitor power supply unit for charging a storage capacitor with a charging capacitor, the method comprising:

disposing switching means between the charging capacitor and the storage capacitor, wherein the switching means is switchable between a first switch position for enabling the charging capacitor to charge the storage capacitor and a second switch position for disabling the charging capacitor from charging the storage capacitor;

comparing voltage output by the charging capacitor to a reference voltage;

providing a switching time control signal to the switching means, the switching time control signal being enabled when the voltage output by the charging capacitor is less than a reference voltage such that current through the switching means is substantially non-existent;

determining charging state of the storage capacitor;

providing a charging state control signal to the switching means, the charging state control signal being enabled when the charging state of the storage capacitor is less than a limit value and being disabled when the charging state of the storage capacitor is greater than the limit value; and switching the switching means to the first switch position when the switching time control signal and the charging state control signal are enabled for enabling the charging capacitor to charge the storage capacitor.

9. The method of claim 8 further comprising:

switching the switching means to the second switch position when the switching time control signal is disabled and the charging state control signal is enabled for disabling the charging capacitor from charging the storage capacitor.

* * * * *

UNITED STATES PATENT AND TRADEMARK OFFICE
CERTIFICATE OF CORRECTION

PATENT NO. : 6,366,058 B1 Page 1 of 1
DATED : April 2, 2002
INVENTOR(S) : Marco Honsberg It is certified that error appears in the above-identified patent and that said Letters Patent is hereby corrected as shown below:

Column 8,
Line 44, should read -- ... value is disabled when the charging state of the storage capacitor is greater than the limit value; --

Signed and Sealed this

Second Day of July, 2002

Attest:

JAMES E. ROGAN
Attesting Officer  Director of the United States Patent and Trademark Office